United States Patent [19]
Fitzsimmons

[11] Patent Number: 5,984,287
[45] Date of Patent: Nov. 16, 1999

[54] TOOL FOR CONSTRUCTING FRAMES

[76] Inventor: George H. Fitzsimmons, 502 Virginia Ave., Louisville, Ky. 40222

[21] Appl. No.: 09/044,733

[22] Filed: Mar. 19, 1998

[51] Int. Cl.[6] ..................................................... B23Q 3/08
[52] U.S. Cl. ............................................................. 269/17
[58] Field of Search ................................ 269/17, 41, 45, 269/71, 76, 152

[56] References Cited

U.S. PATENT DOCUMENTS

| | | |
|---|---|---|
| 783,031 | 2/1905 | Fell . |
| 979,305 | 12/1910 | Hunt . |
| 1,313,061 | 8/1919 | Brown . |
| 1,549,251 | 8/1925 | Geyer . |
| 1,672,996 | 6/1928 | Wilson . |
| 1,755,031 | 4/1930 | Schmuckler . |
| 2,458,370 | 1/1949 | Geddes . |
| 4,683,633 | 8/1987 | Loris ........................................ 269/76 |
| 4,934,643 | 6/1990 | Militano ................................... 269/76 |
| 5,667,207 | 9/1997 | Pistole ...................................... 269/17 |
| 5,707,450 | 1/1998 | Thompson ............................... 269/17 |

FOREIGN PATENT DOCUMENTS 12205  5/1898  United Kingdom ................... 269/245

*Primary Examiner*—David A. Scherbel
*Assistant Examiner*—Daniel G. Shanley
*Attorney, Agent, or Firm*—Wheat, Smith & Beres, PLC; Vance A. Smith; David W. Nagle, Jr.

[57] ABSTRACT

A tool used in the construction of frames includes multiple clamps that are used to secure frame members at precise angles and orientations for welding. The tool includes a vertical support post upon which is mounted a table. First and second clamps are pivotably mounted to the table and allow two frame members to be secured in contact with one another and parallel to the table at a precise angle. A column extends upwardly from the table. At the upper end of this column is a support arm which is held parallel to the table by the column. A third clamp is mounted on the distal end of this support arm. This third clamp can be used to position a vertical or diagonal member in contact with the frame members held by the first and second clamps for welding. Additionally, the tool includes first and second attachments which can be used to secure vertical or diagonal members to the frame.

14 Claims, 11 Drawing Sheets

TOOL FOR CONSTRUCTING FRAMES

BACKGROUND OF THE INVENTION

The present invention relates to a tool that is used in the construction of frames.

For purposes of this description, a frame is a structure having multiple members that are fitted together and united. In constructing frames, attachment of the individual members to one another, by welding or similar means, often requires the use of clamps or vises. Even when using such clamps, it is often difficult to secure adjacent members at precise angles.

For example, in manufacturing awnings, a fabric cover is fit over a frame typically formed by a segments of metal tubing. These frames may define a simple rectangular volume or a complex geometric volume. In constructing such a frame, each individual member is ordinarily attached to adjacent members by a weld. Clamps are commonly used to secure adjacent members at the proper angle and orientation for welding. However it is still difficult to secure adjacent members at precise angles using clamps. When more than two members meet at a joint, it becomes even more difficult to secure the members at the proper angle and orientation for welding. A series of welds is often needed to secure a joint uniting more than two members. In short, construction of these awning frames is often difficult and time-consuming.

It is thus an object of the present invention to provide a tool that facilitates the securing and welding of frame members at precise angles and orientations.

It is a further object of the present invention to provide a tool that allows a single weld to be used to secure three or more members at a joint.

It is still a further object of the present invention to provide a tool that is easy to use, even in construction of complex frame structures, such as those used in the manufacture of awnings.

SUMMARY OF THE INVENTION

The present invention is a tool for making frames. The tool includes multiple clamps that are used to secure frame members at precise angles and orientations for welding. The tool includes a vertical support post upon which is mounted a table. First and second clamps are pivotably mounted to the table and allow two frame members to be secured in contact with one another and parallel to the table at a precise angle. A column extends upwardly from the table. At the upper end of this column is a support arm which is held parallel to the table by the column. A third clamp is mounted on the distal end of this support arm. This third clamp can be used to position a vertical or diagonal member in contact with the frame members held by the first and second clamps for welding. Additionally, the tool includes first and second attachments which can be used to secure vertical or diagonal members to the frame.

DESCRIPTION OF THE PREFERRED EMBODIMENTS

Figure 1:
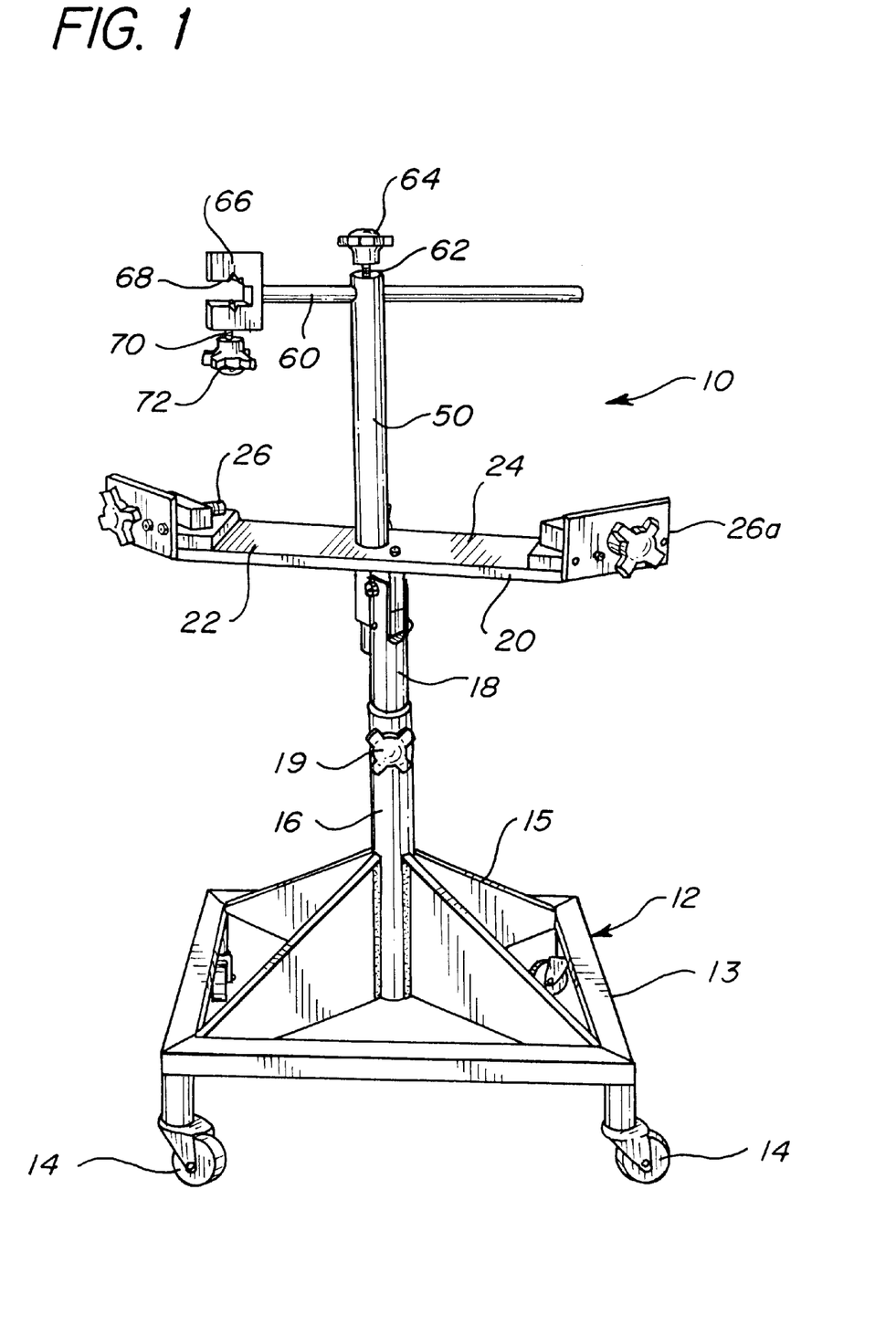
FIG. 1 is a perspective view of a preferred embodiment of a tool for constructing awning frames in accordance with the present invention.
Figure 1A:
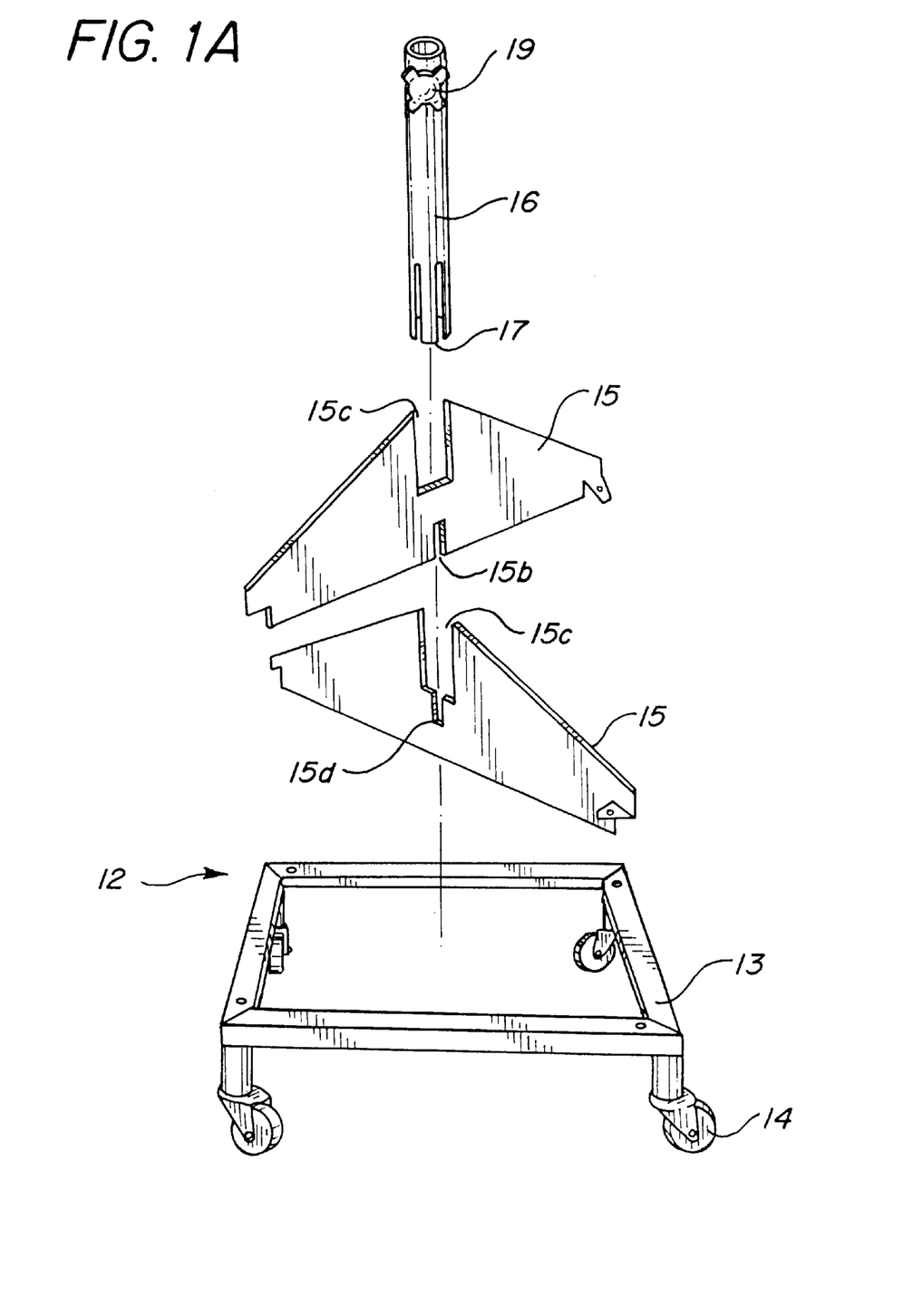
FIG. 1A is a broken-away, exploded perspective view of the base of the tool of FIG. 1.

FIGS. 1, 1A, 2, 2A, 3, and 4 show a preferred embodiment of a tool 10 in accordance with the present invention. A tool base 12, easily assembled for the support of operating components of the tool, includes a rectangularly-shaped base frame 13 preferably mounted on a set of removable casters 14. The assembly of the tool base 12 is best illustrated in FIG. 1A. A pair of removably positioned flange plates 15 have a pair of channels 15c cut into the top center portion thereof. One flange 15 has a notch 15b at the bottom thereof, and the other flange 15 has a notch 15d cut into the bottom of the channel 15c. The first flange 15 is placed diagonally within the frame 13, and the second flange 15 is placed across the other diagonal such that the notches 15b and 15d overlap. A vertical base post 16, preferably a cylindrically shaped pipe, has splines or spaced vertical grooves 17 cut into the circumference thereof into which the vertical edges forming the channels 15c fit. A second vertical post 18 fits within the base post 16 and is preferably mounted for telescopic movement through tightening and loosening of a set screw 19. From the description above, it is understood that the base 12 may be easily assembled and disassembled as desired, thus facilitating compact packaging of the tool for transport.

Figure 2:
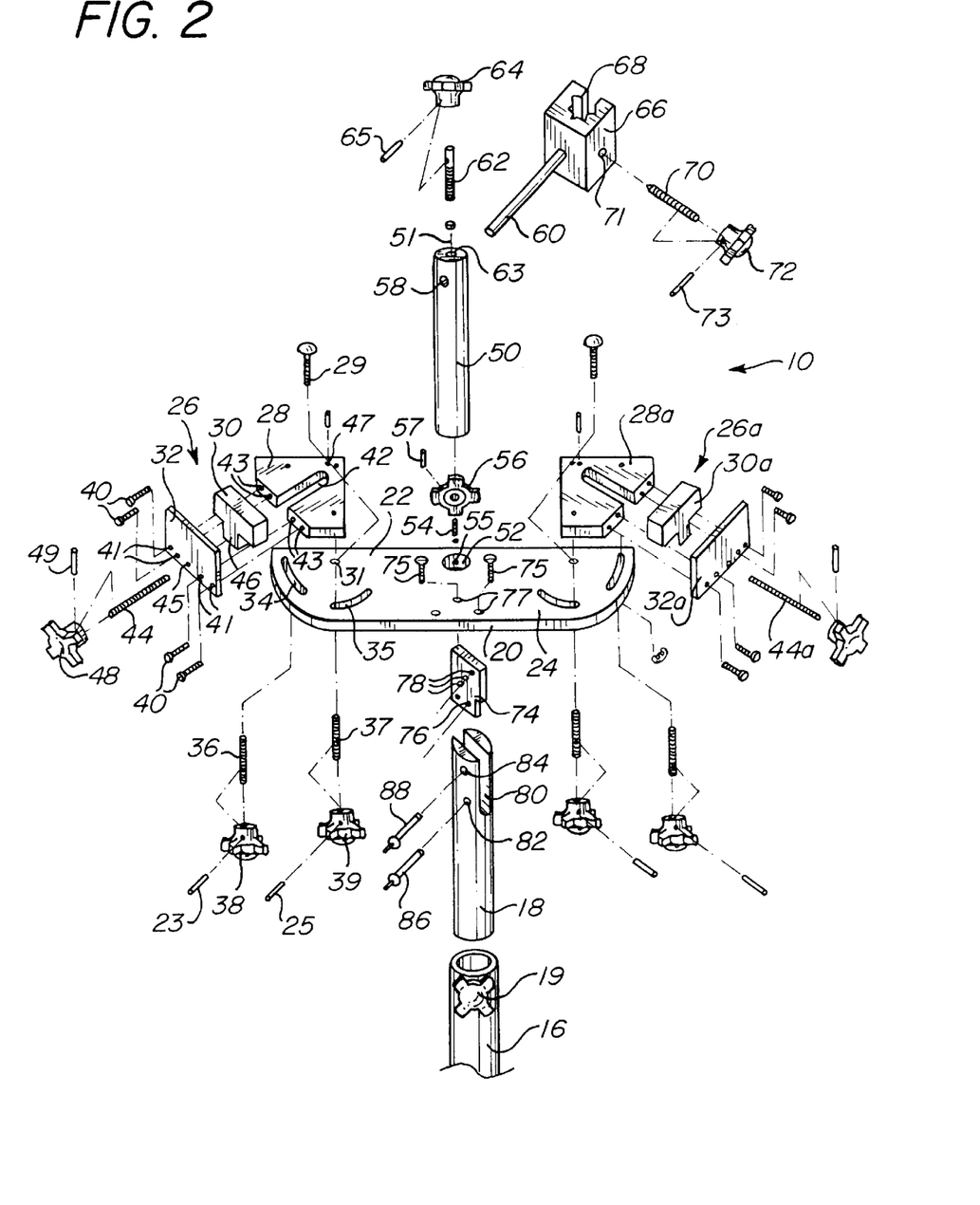
FIG. 2 is a broken-away, exploded perspective view of the tool of FIG. 1.

The tool 10 further includes a table 20 which is pivotably mounted to said vertical support post 18, as will be further described. The table 20 has a left end 22 and a right end 24. Mounted on the left end 22 of the table 20 is a first clamp 26, and mounted on the right end 24 of the table 20 is a second clamp 26a. As best shown in FIG. 2, the first clamp 26 includes a base portion 28, a slidable clamp member 30, and a fixed clamp member 32. The base portion 28 is rotatably mounted to the table 20, pivoting about a pin 29. This pin 29 is simply a bolt that extends through the base portion 28 and through a hole 31 defined by the table 20. The left end 22 of the table 20 defines two curved slots 34, 35. Two screws 36, 37 extend from below the table 20, one through each of the slots 34, 35 and into the base portion 28 of the clamp 26. Thus, the base portion 28 may rotate about the pin 29, but this rotation is limited by the travel of the screws 36, 37 within the respective slots 34, 35. In this preferred embodiment, the slots 34, 35 permit a rotation of +/−45 degrees. Adjustment knobs 38, 39 are preferably mounted on the free end of each of the screws 36, 37 by pins 23, 25. By tightening the screws 36, 37 with the adjustment knobs 38, 39 such that the knobs 38, 39 are pressed against the bottom of the table 20, the base portion 28 of the clamp 26 may be secured against rotation relative to the table 20. Thus, the clamp 26 may be fixed at a selected angle relative to the table 20.

The fixed clamp member 32 is secured to the front face of the base portion 28 of the clamp 26 by a plurality of fastening screws 40. The fastening screws 40 are threaded through holes 41 defined by the fixed clamp member 32 and into holes 43 defined by the base portion 28. The base portion 28 of the clamp 26 also defines a central slot 42 for receiving the slidable clamp member 30. An adjustment screw 44 extends through a hole 45 defined by the fixed clamp member 32, is threaded through a hole 46 in the slidable clamp member 30, and terminates in a bore 47 at the closed end of the 42 slot defined by the base portion 28. In this manner, clockwise turning of the adjustment screw 44 causes the slidable clamp member 30 to move along the central slot 42 defined by the base portion 28 and toward the fixed clamp member 32, thereby closing the clamp 26. Counterclockwise turning of the adjustment screw 44 opens the clamp 26. To facilitate the opening and closing of the clamp 26, an adjustment knob 48 is preferably mounted on the free end of the adjustment screw 44 by means of a pin 49.

A second clamp 26a is similarly mounted on the right end 24 of the table 20. It also includes a base portion 28a, a slidable clamp member 30a, and a fixed clamp member 32a, wherein turning of an adjustment screw 44a opens and closes the clamp 26a. As will be discussed in more detail, the first and second clamps 26, 26a permit two frame members to be held in contact at a precise, predetermined angle for welding.

Figure 2A:
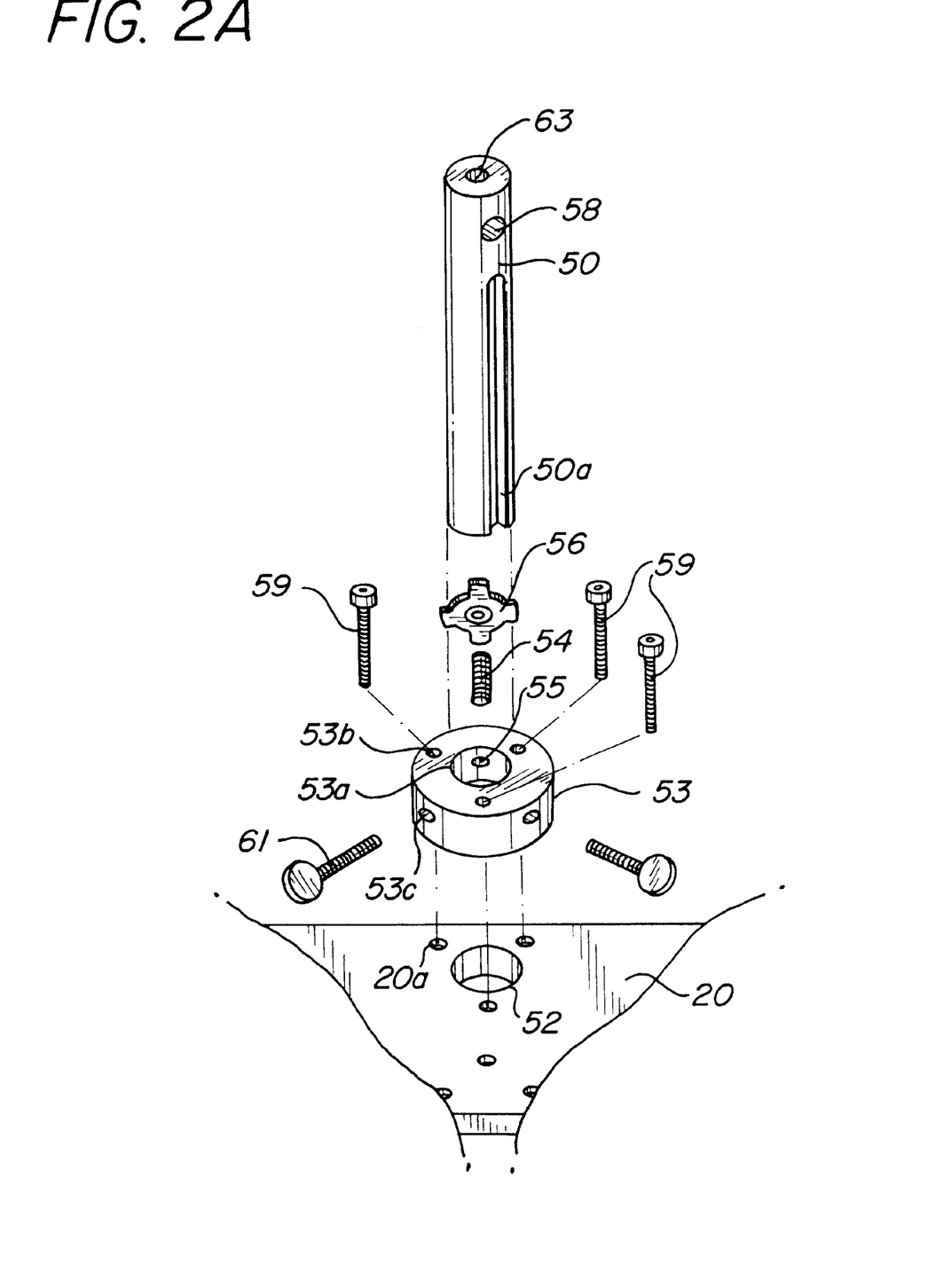
FIG. 2A is a broken-away, exploded perspective view of the collar and the attachment of the support post to the table of the tool of FIG. 1.
Figure 3:
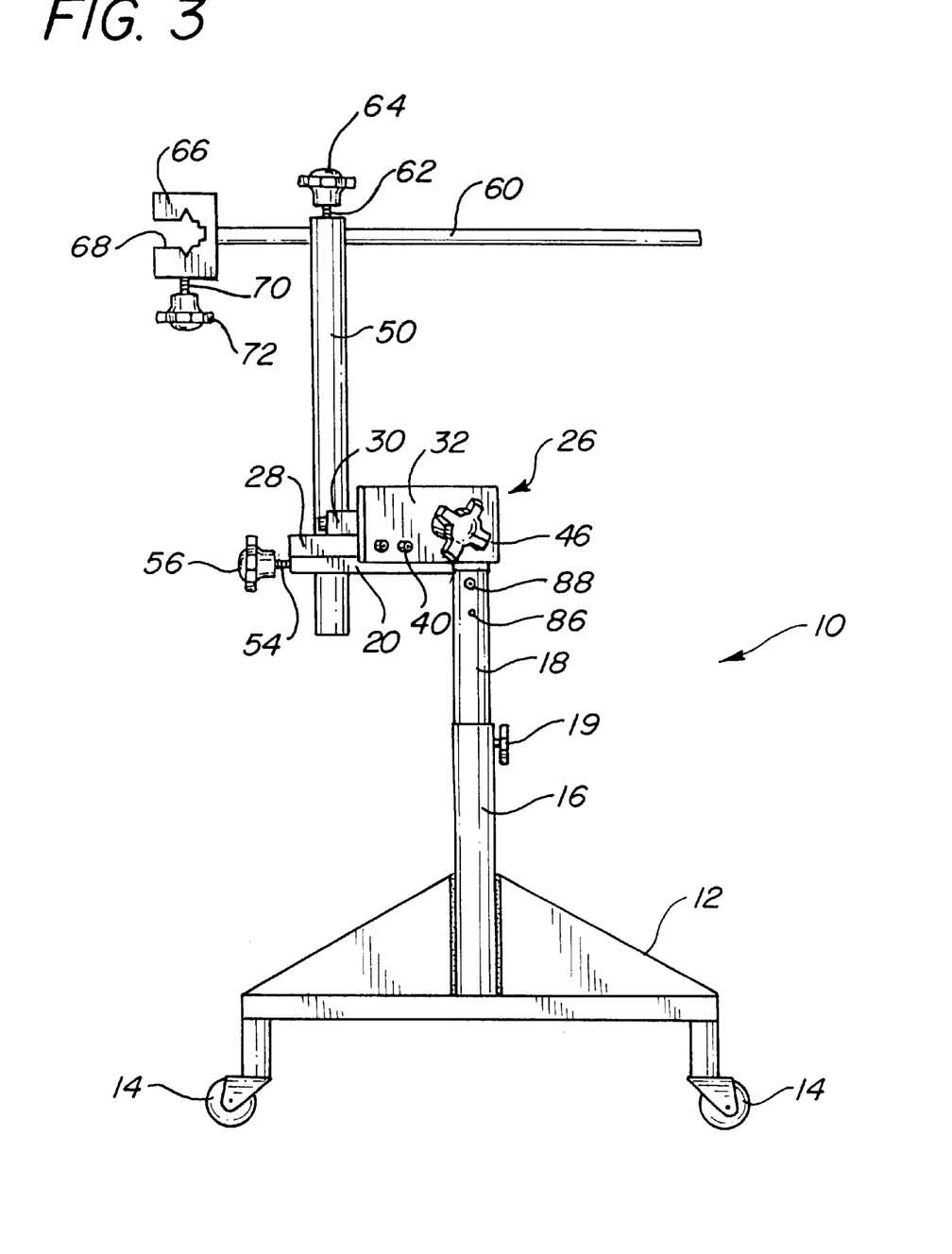
FIG. 3 is a side view of the tool of FIG. 1.
Figure 4:
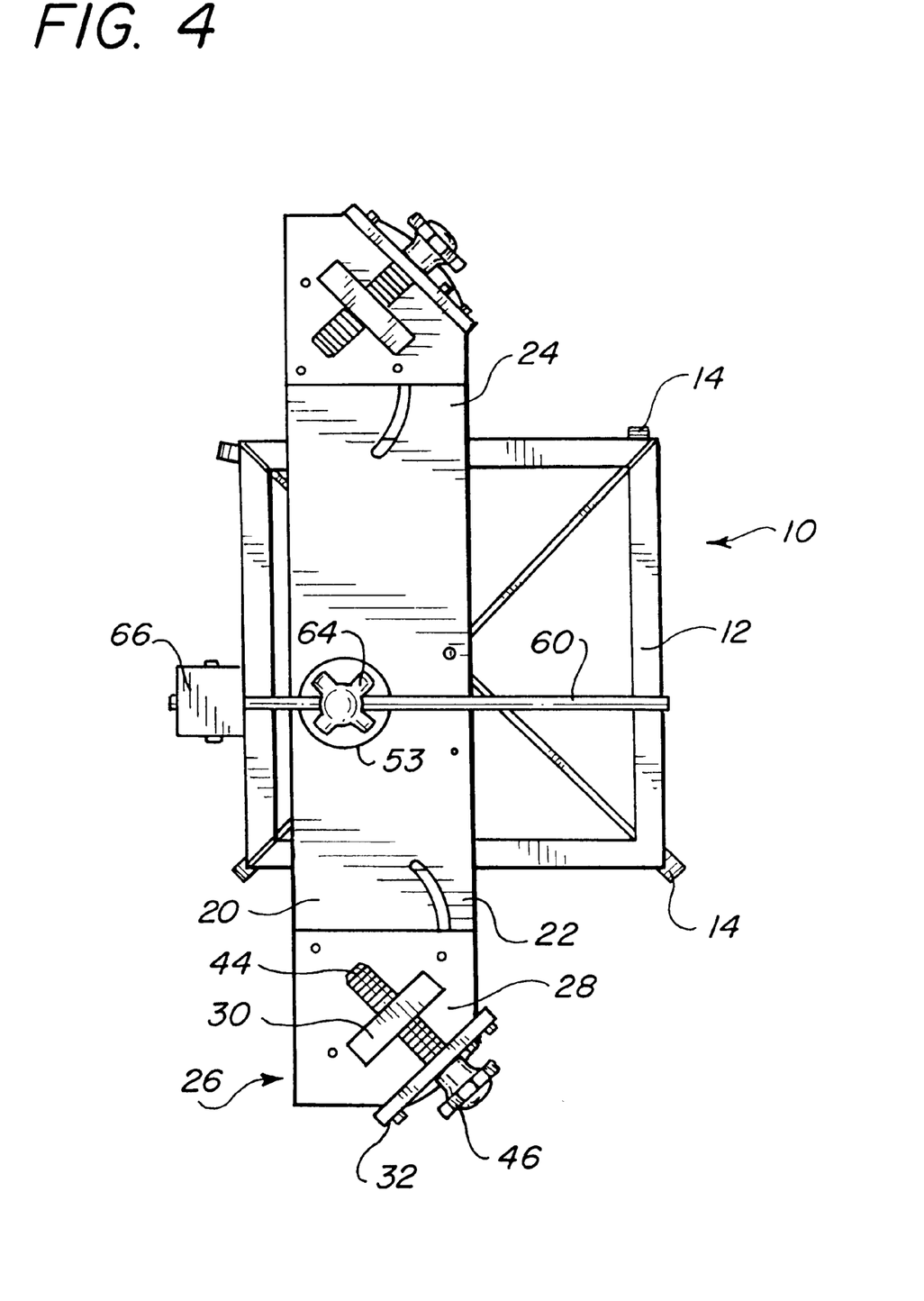
FIG. 4 is a top view of the tool of FIG. 1.

The tool 10 of the present invention also has a vertical column 50 that extends through an opening 52 in the table 20. The opening 52 is located at a point between the first and second clamps 26, 26a. The vertical column 50 fits through this opening 52, and the column 50 can be raised or lowered relative to the table 20. FIG. 2A illustrates a preferred structure for the mounting and indexing of vertical column 50 with respect to table 20 and clamps 26 and 26a. In this structure, an annular collar 53 is positioned on the table 20 and secured by a plurality of bolts 59 extending through holes 53b defined by the collar 53 and threaded into holes 20a of the table 20. A set screw 54 extends through a hole 55 defined by the collar 53 where it is used to secure the vertical column 50 relative to the collar 53. An adjustment knob 56 is mounted on the free end of the set screw 54 by means of a pin 57 to facilitate tightening and loosening of the set screw 54. The column 50 is further provided with a pair of grooves 50a designed to register with holes 53c in the collar 53. When the holes 53c are in registry with the grooves 50a in the column 50, a pair of spring-loaded ball bearings mounted in the end of finger bolts 61 becomes positioned in the grooves 50a. The coupling of bearings in the grooves and the additional tightening of the set screw 54 using the adjustment knob 56 provide for a sturdy seat for the column 50 with respect to table 20.

At the upper end of the vertical column 50, there is a transverse bore 58 that extends through the column 50, perpendicular to the vertical axis 51 of the column 50. A support arm 60 fits through this bore 58 and is thereby held parallel to the surface of the table 20. The support arm 60 is secured by a set screw 62 which extends through a hole 63 in the top of the column 50 into the bore 58. An adjustment knob 64 is also mounted on the free end of this set screw 62 by means of a pin 65 to facilitate tightening and loosening of the set screw 62.

A third clamp 66 is mounted on the distal end of the support arm 60. The third clamp 66 defines a channel 68 that is adapted to receive a frame member during construction of a frame, as will be discussed further. A set screw 70 extends through a hole 71 in the side of the clamp 66 into this channel 68 to secure the frame member within the clamp 66. An adjustment knob 72 is mounted on the free end of this set screw 70 by means of a pin 73 to facilitate tightening and loosening of the set screw 70.

Figures 5, 6:
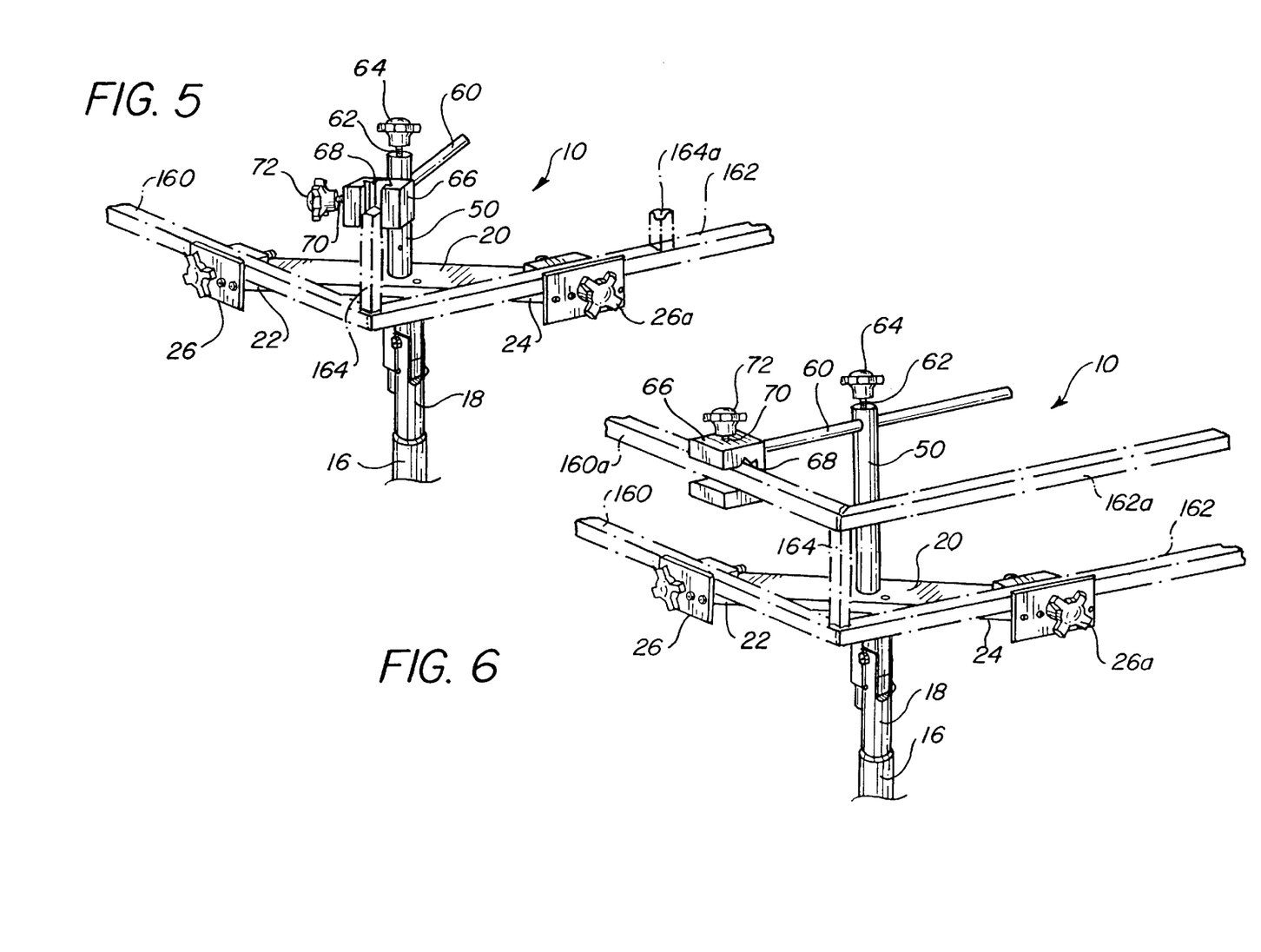
FIG. 5 is a broken-away perspective view of the tool of FIG. 1, wherein two horizontal members and one vertical member are being held in contact for welding.
FIG. 6 is a broken-away perspective view of the tool of FIG. 1, wherein an upper frame section and a lower frame section are held in contact for welding.
Figure 7:
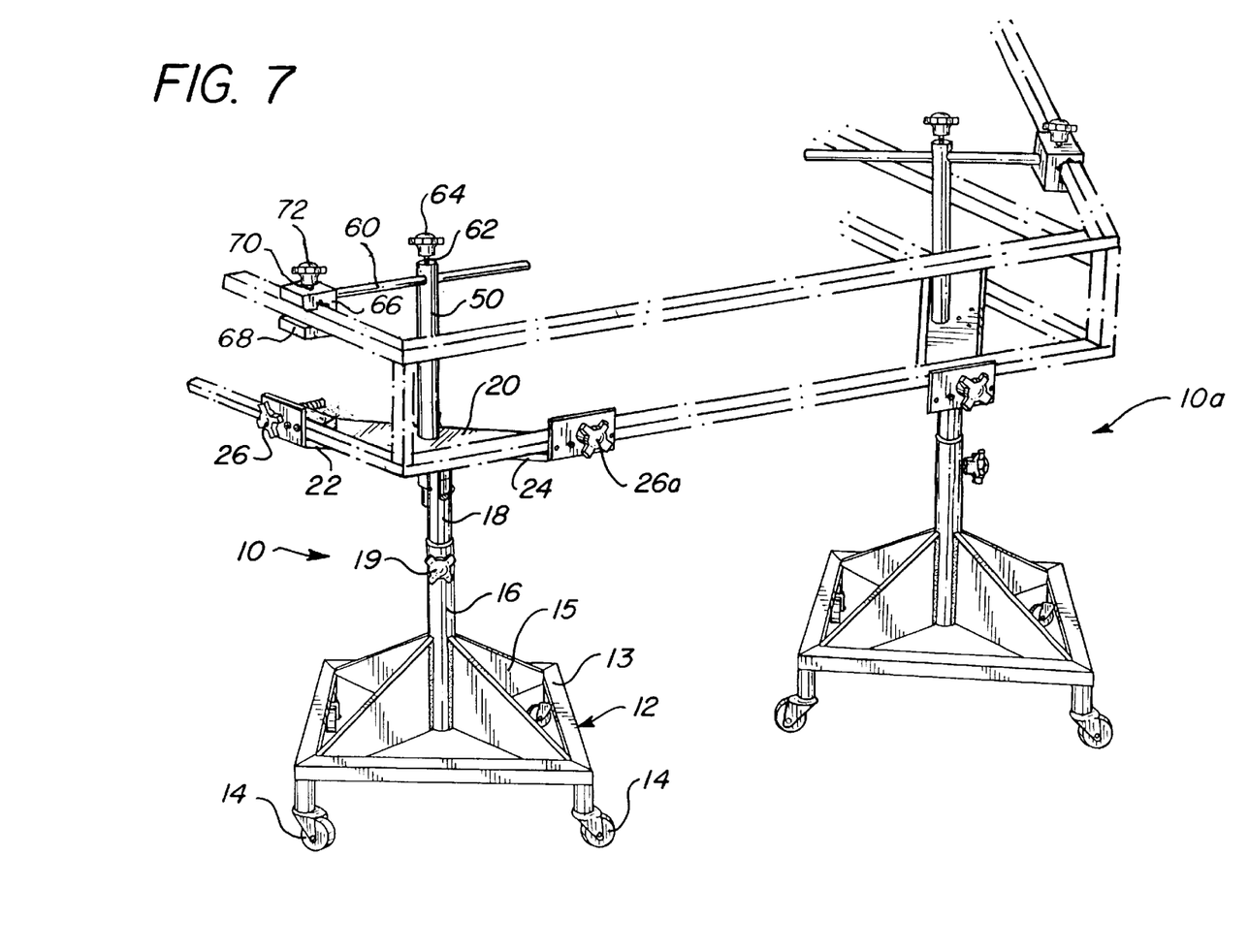
FIG. 7 is a perspective view showing two of the tools of FIG. 1 being used in the construction of a frame.

FIGS. 5–7 demonstrate how the tool 10 of the present invention may be used in constructing frames, particularly awning frames. In FIG. 5, a first horizontal frame member 160 is secured by the first clamp 26, and a second horizontal frame member 162 is secured by the second clamp 26a, such that the first and second horizontal frame members 160, 162 are held in contact in a plane parallel to the table 20 and at a 90-degree angle for welding. Additionally, a vertical frame member 164 is held by the third clamp 66. By adjusting the vertical position of the column 50 relative to the table 20 and the horizontal position of the support arm 60 relative to the column 50, the vertical frame member 164 is held in contact with and substantially perpendicular to the joint defined by the first and second horizontal frame members 160, 162. In this manner, the frame members 160, 162, 164 are securely positioned such that a single weld can be made joining the three members 160, 162, 164. Also, by repositioning the support arm 60, through adjusting the horizontal position, or length, of the support arm 60 relative to the column 50, additional vertical members 164a (shown in dashed lines) can be positioned for welding anywhere along the horizontal members 160, 162.

In FIG. 6, two horizontal frame sections are welded together. The lower section, as shown in FIG. 5 and described above, includes first and second horizontal frame members 160, 162 and a vertical frame member 164. The upper section includes first and second horizontal frame members 160a, 162a that were previously welded together. The third clamp 66 is used to position the upper section for attachment to the vertical frame member 164 of the lower section. In this manner, three-dimensional frame structures can be easily constructed using the tool 10 of the present invention.

In FIG. 7, two tools 10, 10a are used together to facilitate construction of a frame.

Figure 8:
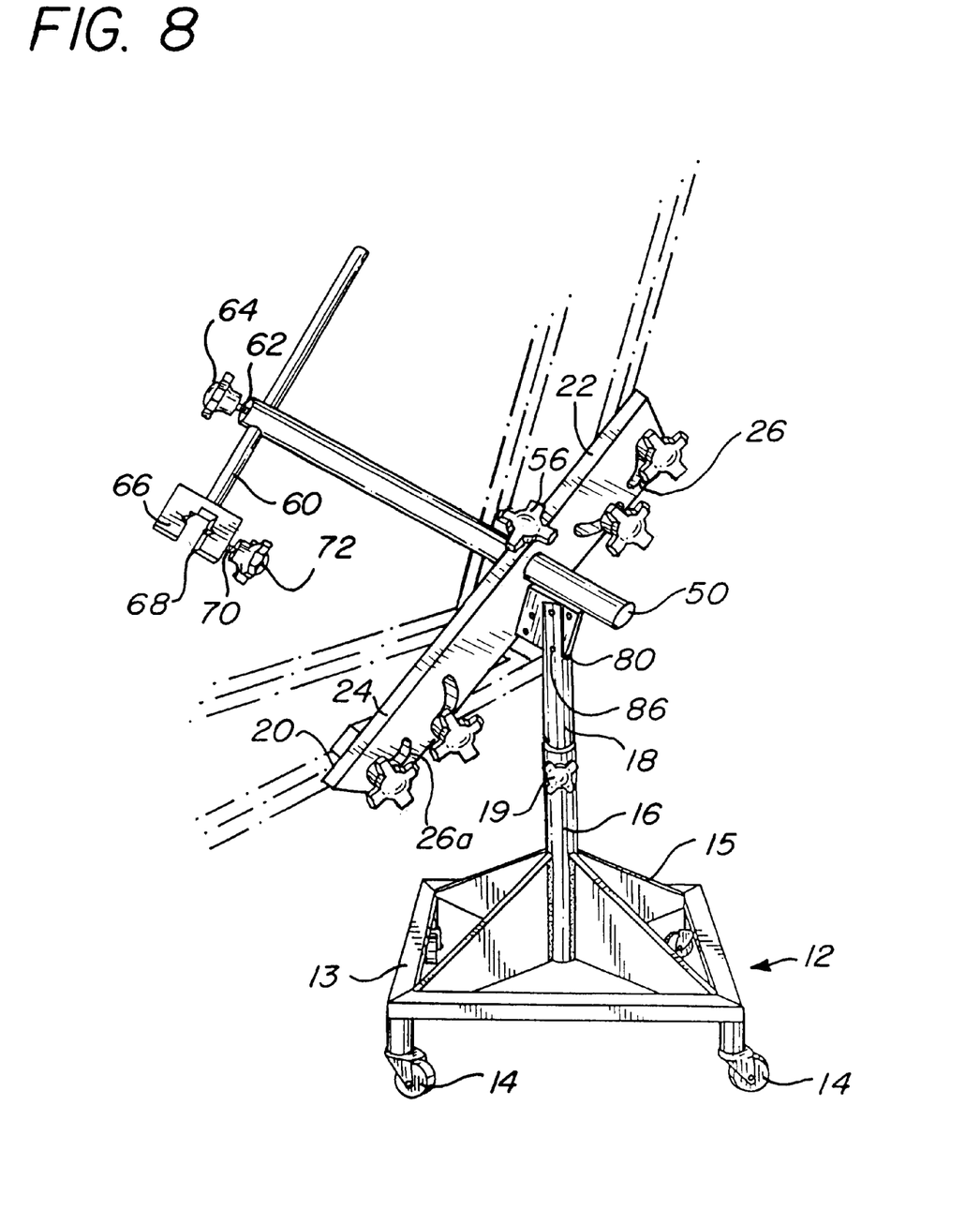
FIG. 8 is a perspective view of the tool of FIG. 1, wherein the table is pivoted to a substantially vertical position to allow welding along the bottom surface of the joint.

To provide clear access to the bottom portion of the joint formed between frame members, the table 20 can easily be pivoted about the vertical support post 18 from the substantially horizontal position shown in FIGS. 5 and 6 to a more vertical position, as illustrated in FIG. 8. The out-of-horizontal position of table 20 in FIG. 8 allows the user to complete the weld along the bottom portion of the joint. The structure permitting the table 20 to be indexed into various rotational positions is best illustrated in FIG. 2 where a vertically oriented pivot flange 74 is fixed to the under surface of the table 20 by bolts 75 which extend through holes 77 in the table 20 and are threaded into the upper edges of pivot flange 74. The flange 74 defines a first, lower hole 76 and a plurality of spaced upper holes 78 arranged in an arc about the lower hole 76. The arc displacement between holes 78 may be at any increment such as, for example, 22.5°. The flange 74 is received in a yoke 80 formed in the upper end of the support post 18. The post 18 has a first, lower hole 82 though both legs of the yoke 80 designed to register with the lower hole 76 of the flange 74 and an upper hole 82 designed to register with one of the upper holes 78 of the flange, depending upon the desired inclination of the table 20. When the flange 74 is received in the yoke 80, a first bolt 86 is fitted through the first, lower hole 82 of the support post 18 and through the lower hole 76 of the flange 74, thereby creating a pivot about which the flange 74 may rotate relative to the support post 18. A second bolt 88 is fitted through the upper hole 84 of the support post 18 and through one of the upper holes 78 of the flange 74 to secure the flange 74 at a selected angle relative to the support post 18. During most welding operations, the flange 74 is secured such that the table 20 is substantially perpendicular to the support post 18. To access the bottom surface of the joint, the second bolt 88 is removed, and the table 20 is rotated to the appropriate position. The second bolt 88 is then re-inserted through the upper hole 84 of the support post and corresponding one of the upper holes 78 of the flange 74, securing the table 20 at the selected inclination.

Figure 9:
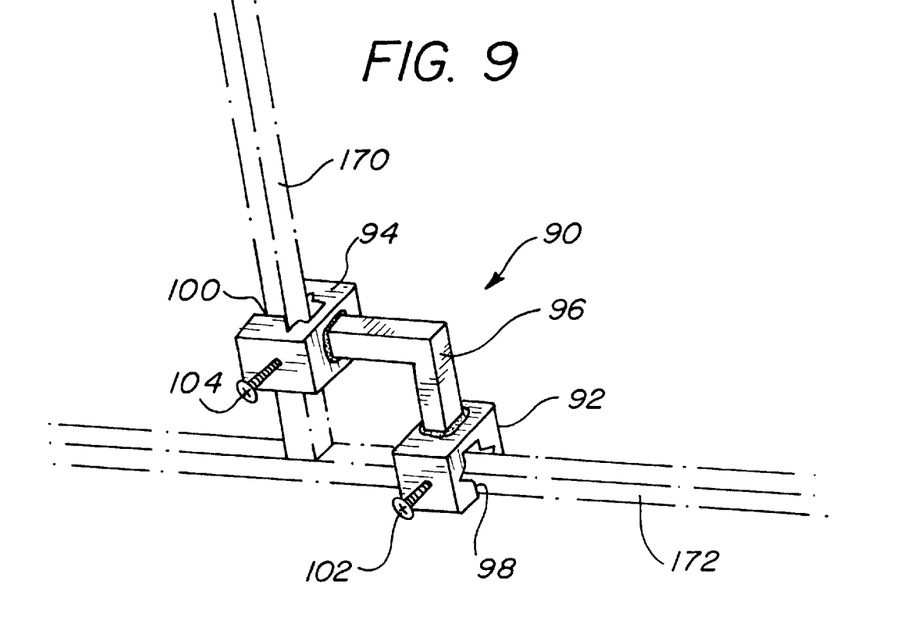
FIG. 9 is a perspective view of a first attachment that is used to position a vertical member perpendicular to a horizontal member for welding.

FIG. 9 shows a first attachment for use with the tool 10 described above. The first attachment 90 includes a first clamp portion 92 and a second clamp portion 94, said clamp portions 92, 94 being connected by a 90-degree angle section 96. Each clamp portion 92, 94 defines a channel 98, 100 adapted to receive a frame member. Set screws 102, 104 extend into the respective channels 98, 100 defined by the clamp portions 92, 94, thereby allowing a frame member to be secured within each clamp portion 92, 94. Although not shown in the figures, the free ends of these set screws 102, 104 may also be equipped with adjustment knobs to facilitate tightening and loosening of the screws 102, 104. Thus, as shown in FIG. 9, the attachment 90 permits two frame members 170, 172 to be held perpendicular to one another for welding. This attachment 90 is preferably used to secure vertical members to portions of the frame that can not be reached by the third clamp 66.

Figure 10:
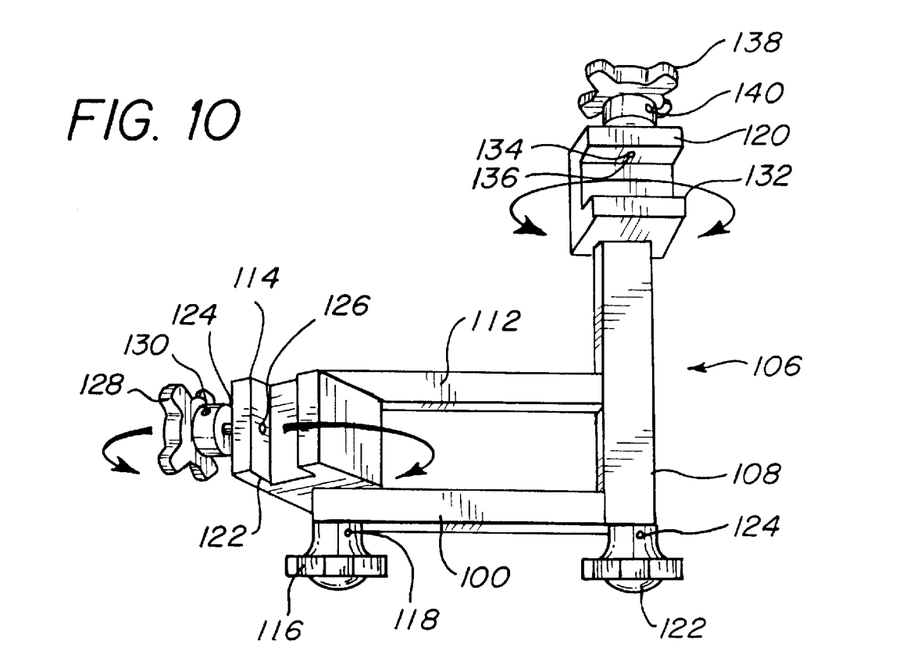
FIG. 10 is a perspective view of a second attachment that is used to position a diagonal member for welding.

FIG. 10 shows a second attachment 106 for use with the tool 10 described above. This attachment 106 includes an upper arm 108. Extending from and perpendicular to this upper arm 108 are two parallel, spaced lower arms 110, 112. A first clamp portion 114 is pivotably mounted between the distal ends of the lower arms 110, 112. A screw (not shown) extends through a bore in the first lower arm 110, through a bore in the first clamp portion 114, and is threaded into the second lower arm 112. An adjustment knob 116 is mounted on the free end of the screw by means of a pin 118. The first clamp portion 114 is thus free to rotate about the screw; however, tightening of the screw, through rotation of the adjustment knob 116, will cause the lower arms 110, 112 to be drawn together, preventing rotation of the first clamp portion 114 relative to the lower arms 110, 112. A second clamp portion 120 is mounted on the distal end of the upper arm 108 by means of a second screw (not shown). This screw extends through the upper arm 108 and threads into the side of the second clamp portion 120. A adjustment knob 122 is mounted on the opposite end of the second screw by means of a pin 124. The second clamp portion 120 is free to rotate about the axis defined by the second screw. However, as the second screw is tightened, the second clamp portion 120 is pressed against the upper arm 108, preventing rotation of the second clamp portion relative to the upper arm 108.

Similar to the third clamp 66, as described above, the first clamp portion 114 of the second attachment 106 defines a channel 122 that is adapted to receive a frame member. A set screw 124 extends through a hole 126 in the side of the first clamp portion 124 into this channel 122 to secure the frame member within the first clamp portion 114. An adjustment knob 128 is mounted on the free end of this set screw 124 by means of a pin 130 to facilitate tightening and loosening of the set screw 124.

The second clamp portion 120 of the second attachment 106 also defines a channel 132 that is adapted to receive a frame member. A set screw 134 extends through a hole 136 in the side of the second clamp portion 120 into this channel 132 to secure the frame member within the second clamp portion 120. An adjustment knob 138 is mounted on the free end of this set screw 134 by means of a pin 140 to facilitate tightening and loosening of the set screw 134.

Thus, the first clamp portion 114 of this second attachment may be fixed to an existing member of a frame. The second clamp portion holds a member to be attached to a frame. The pivoting features of each clamp portion 114, 120 allow for positioning and securing of a frame member at any desired angle for fixing a diagonal member to the frame.

Figure 11:
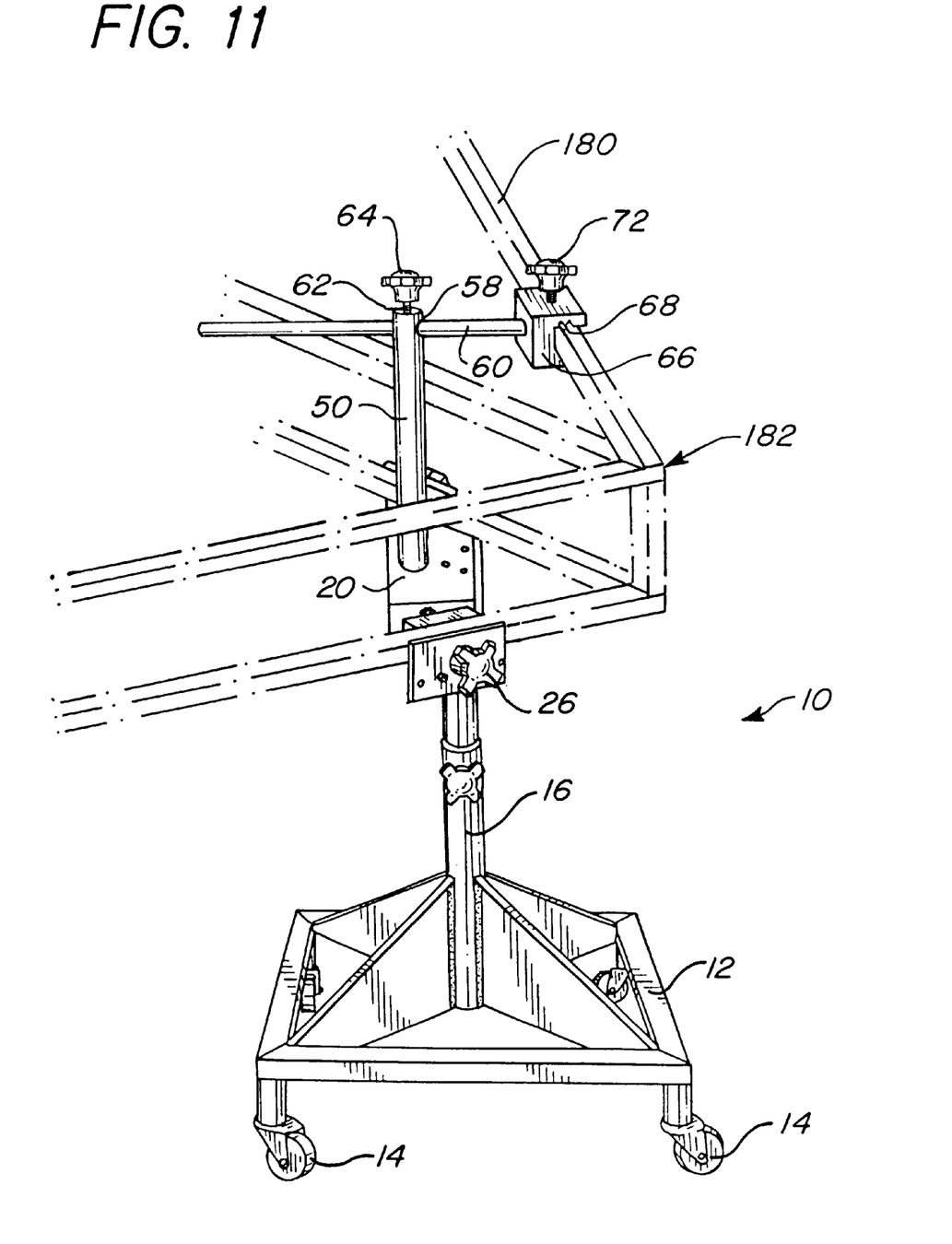
FIG. 11 is a perspective view of the tool of FIG. 1, wherein the third clamp of the tool is being used to hold a diagonal member in contact with the frame for welding.

FIG. 11 shows how the third clamp 66 may be used to position a diagonal frame member 180 for welding to an existing joint, generally indicated by the numeral 182. The support arm 60 on which the third clamp 66 is mounted may be rotated within the bore 58 of the vertical column 50, thereby allowing the clamp 66 to be used to position a diagonal member at any required angle.

It will be obvious to those skilled in the art that modifications may be made to the embodiments described above without departing from the scope of the present invention.

What is claimed is:

1. A tool for constructing frames, comprising:

a base;

a support post extending upwardly from said base;

a table mounted on said support post, said table defining a support surface and having a left end and a right end;

a first clamp mounted on the left end of said table and adapted to receive and secure a first frame member, said first clamp being oriented such that said first frame member can be held substantially parallel to the support surface defined by said table; and a second clamp mounted on the right end of said table and adapted to receive and secure a second frame member, said second clamp being oriented such that said second frame member can be held substantially parallel to the support surface defined by said table;

wherein said first and second clamps can hold said first and second frame members in an abutting relationship so that they may be secured together by a weld; and wherein said first and second clamps are pivotably mounted to said table and rotate independently about axes that are substantially perpendicular to the support surface defined by said table such that the relative angle between frame members held by the first and second clamps may be adjusted.

2. A tool as recited in claim 1, wherein said table is pivotably mounted on said support post such that said table can be pivoted from a substantially horizontal position to a substantially vertical position.

3. A tool as recited in claim 1, and further comprising:

a vertical column extending upwardly from said table, and having an upper end;

a horizontal support arm attached to and extending from the upper end of said vertical column, and having a distal end; and a third clamp mounted on the distal end of said horizontal support arm, wherein said third clamp can hold a frame member adjacent at least one of the frame members held by said first and second clamps.

4. A tool as recited in claim 3, and further comprising:

an opening defined by said table, wherein said support post extends through said opening and may be rotated within said opening to adjust the position of the support arm and the third clamp relative to said first and second clamps.

5. A tool as recited in claim 4, and further comprising:

a first adjustment means that allows said vertical column to be raised and lowered within said opening; and a second adjustment means that allows for horizontal adjustment of the support arm relative to the vertical column;

wherein said first and second adjustment means are used to position said third clamp.

6. A tool as recited in claim 1, and further comprising a first attachment, said first attachment comprising:

a first clamp portion adapted to receive a frame member;

a second clamp portion adapted to receive a frame member;

an angle portion connecting said first and second clamps portions such that frame members can be held in contact with and perpendicular to one another.

7. A tool as recited in claim 1 and further comprising a second attachment, said second attachment comprising:

an upper arm;

two parallel, spaced lower arms extending from and perpendicular to said upper arm;

a first clamp portion rotatably mounted to a distal end of said upper arm and adapted to receive a frame member; and a second clamp portion rotatably mounted between said parallel, spaced lower arms;

wherein said first and second clamp portions can be used to secure a diagonal frame member to an existing member of a frame.

8. A tool for the manipulation of a plurality of work pieces for securing the same together into unitary frame comprising:

a support assembly;

a first vise assembly including a support table mounted on said support assembly and a pair of spaced first and second clamps for securing respective first and second work pieces, said spaced clamps secured to said support table and each separably moveable in an arc relative to said support table; and a second vise assembly including a support column rotatably attached to said support table, a support arm attached to said support column and extending therefrom in a direction essentially parallel to an upper surface of said support table, and an adjustable third clamp secured to one end of said support arm for securing a third work piece; said support arm being extendable relative to said support column to adjust the distance of said third clamp from said column whereby said first and second vise assemblies and said first, second, and third clamps may be adjusted to bring the distal ends of said first, second, and third work pieces into close juncture and at a predetermined angular relationship with one another for securing said work pieces into a unitary frame having the predetermined angular relationship at said juncture.

9. A tool as recited in claim 8 in which said support assembly comprises a rectangularly-shaped base, a pair of removable flange members essentially vertically positioned in said rectangular base and defining a multi-edged slot, and a support tube coupled to said support table, said support tube having a splined lower distal end that fits within said multi-edged slot to vertically position said support tube.

10. A tool as recited in claim 9 in which said support tube comprises an upper and lower section, said upper section being telescopically mounted with respect to said lower section.

11. A tool as recited in claim 8 in which said first and second vise assemblies can be rotated together as a unit relative to said support assembly from a first position where said support table is essentially horizontal to a second position where said support table is secured into a non-horizontal position, thereby facilitating additional access to said juncture of said work pieces.

12. A tool as recited in claim 11 in which said support table pivots into one of a plurality of positions and includes a bracket secured to an under surface of said support table, said support tube having an end mounted to said bracket about a pivot pin, said bracket having a plurality of spaced openings arranged in an arc about said pivot pin with said support tube having an opening registering with one of said spaced openings and adapted to receive a position fixing pin thereby securing said support table in one of said plurality of positions.

13. The tool of claim 8 in which said first and second clamps each include a work piece support plate abutting and pivotally secured to a top surface of said support table along said arc.

14. The tool of claim 8 in which an annular collar is secured to a top surface of said support table, said support column being positioned in said collar essentially vertical with respect to said top surface and being rotatably adjustable relative to said collar and said support table.

* * * * *